(12) United States Patent
Golembiewski et al.

(10) Patent No.: US 11,449,941 B2
(45) Date of Patent: Sep. 20, 2022

(54) COMPUTER SYSTEM FOR GENERATING AND MANAGING DATA FLOWS ASSOCIATED WITH INTEREACTIVE DISPLAYS

(75) Inventors: Keith E. Golembiewski, Suffield, CT (US); Kevin W. Stange, Simsbury, CT (US); Christopher B. Abreu, Farmington, CT (US)

(73) Assignee: TALCOTT RESOLUTION LIFE INSURANCE COMPANY, Windsor, CT (US)

( * ) Notice: Subject to any disclaimer, the term of this patent is extended or adjusted under 35 U.S.C. 154(b) by 580 days.

(21) Appl. No.: 13/283,135

(22) Filed: Oct. 27, 2011

(65) Prior Publication Data

US 2013/0110742 A1 May 2, 2013

(51) Int. Cl.
*G06Q 40/06* (2012.01)
(52) U.S. Cl.
CPC .................................. *G06Q 40/06* (2013.01)
(58) Field of Classification Search
CPC ........ G06Q 40/00; G06Q 40/04; G06Q 40/06; G06Q 40/08
USPC ................................................ 705/35–37, 4
See application file for complete search history.

(56) References Cited

U.S. PATENT DOCUMENTS

| | | | |
|---|---|---|---|
| 6,219,650 B1* | 4/2001 | Friend et al. | ............... 705/36 R |
| 7,398,241 B2 | 7/2008 | Fay et al. | |
| 7,848,989 B2 | 12/2010 | Tatro et al. | |
| 7,941,358 B2 | 5/2011 | Caruso et al. | |
| 2006/0020531 A1* | 1/2006 | Veeneman et al. | ............. 705/35 |
| 2006/0212380 A1* | 9/2006 | Williams et al. | ............... 705/35 |

(Continued)

FOREIGN PATENT DOCUMENTS

WO      WO0013118      3/2000

OTHER PUBLICATIONS

New york life brings longevity protection to immediate annuities; new option allows clients to customize retirement payments according to personal needs and life events. (Oct. 6, 2005). Business Wire, pp. 1-1. Retrieved from http://search.proquest.com/docview/445357415?accountid=14753.*

(Continued)

*Primary Examiner* — Hani M Kazimi
(74) *Attorney, Agent, or Firm* — Howard IP Law Group, PC

(57) ABSTRACT

Disclosed herein are a computer system, computer-implemented methods, and related technologies that may be used for administering a customizable annuity product. The customizable annuity product has a number of investment sleeves, each of which is tied to an index such as a mutual fund or a stock index. For each investment sleeve, the annuity purchaser can choose the index to which the account is tied, though funds from the annuity product are not actually invested in the indices. During the accumulation phase of a customizable annuity product, the account value for the product may increase (or, potentially, decrease) in proportion with the performance of the indices to which the investment sleeves are tied. The disclosed computer system, computer-implemented methods, and related technologies may be used by an insurance company or other financial institution to administer the customizable annuity product and communicate with the purchasers of customizable annuity product.

5 Claims, 7 Drawing Sheets

(56) References Cited

U.S. PATENT DOCUMENTS

| | | |
|---|---|---|
| 2007/0136109 A1 | 7/2007 | Yager et al. |
| 2008/0071661 A1* | 3/2008 | Jeudy et al. ............... 705/36 R |
| 2008/0189219 A1* | 8/2008 | Herschler et al. .......... 705/36 R |
| 2008/0189223 A1 | 8/2008 | Baiye |
| 2009/0150301 A1 | 6/2009 | Abbott et al. |
| 2009/0307016 A1 | 12/2009 | Gray et al. |
| 2010/0280971 A1* | 11/2010 | Haskins et al. ............. 705/36 R |
| 2012/0078816 A1* | 3/2012 | Braun et al. ................ 705/36 R |
| 2012/0191626 A1* | 7/2012 | Ahn et al. ................... 705/36 R |
| 2012/0226631 A1* | 9/2012 | Ameriks et al. ............ 705/36 R |
| 2012/0233088 A1* | 9/2012 | Advani et al. .............. 705/36 R |

OTHER PUBLICATIONS

Nationwide funds group launches new alternatives allocation fund. (Jul. 25, 2011). Business Wire Retrieved from https://dialog.proquest.com/professional/docview/878909978?accountid=131444 (Year: 2011).*

* cited by examiner

COMPUTER SYSTEM FOR GENERATING AND MANAGING DATA FLOWS ASSOCIATED WITH INTEREACTIVE DISPLAYS

BACKGROUND

Insurance companies and other financial institutions frequently use new technologies in order to manage data, perform transactions, and interact with customers. As one example, insurance companies handle massive amounts of data related to their customers and the policies they have issued. To handle this data, insurance companies frequently employ advance storage system and data warehousing technologies. As another example, investment firms and other institutions frequently use advanced high-frequency trading (HFT) systems in order to execute transactions. These high-frequency trading systems often include specialized software and specialized hardware such as Field Programmable Gate Arrays (FPGAs) in order to execute trades at ever-increasing speeds. As another example, insurance companies and other institutions also leverage new technologies that are available in smartphones and tablet devices, in order to interact with existing customers and attract new customers.

One of the areas in which insurance companies frequently employ these new technologies is in the area of administering investment products such as annuity contracts (which are also referred to as "annuity products" or, simply, as "annuities"). With an annuity product, the insurance company agrees, in return for one or more payments by the purchaser of the product, to make payments (referred to as "distributions") to the purchaser, beginning at some point in the future. The distributions may be periodic, and may last for a fixed term or until the death of the purchaser or other individual.

Annuity products can possess a number of different attributes, and can be classified in a number of different ways according to those attributes. For example, annuities can be classified according to when distributions begin. If distributions begin immediately after the annuity is purchased, the annuity is considered to be an "immediate" annuity; if distributions begin at a later time (typically, a time set period that is defined in the annuity contract), the annuity is considered to be a "deferred" annuity. Further, annuities can be classified according to how the account value is permitted to change. For example, in a "variable" annuity, the funds in the annuity are divided into a number of investment sleeves, and the funds for each subaccount are placed in an investment vehicle such as a mutual fund. With a variable annuity, the account value fluctuates based on the performance of the investment vehicles in which the subaccounts are invested. With a "fixed" annuity, on the other hand, the account value is guaranteed to increase at a set rate or at least a guaranteed minimum rate. Further, an "indexed" annuity (also referred to as an "index-linked" annuity) is an annuity where the account value of the annuity is tied to an external factor (such as the performance of a stock index, such as the S&P 500), and the account value may fluctuate based on changes in value of the external factor.

While the above-mentioned types of annuities are adequate for some investors, they all possess disadvantages, and could be improved in a number of ways. For example, investors could benefit from greater flexibility in terms of how annuity products are structured, as well as from greater flexibility in terms of the options that are available for indexing/linking against. Thus, the computing system and related technologies disclosed herein and described in detail below, which provide contract purchasers with such flexibility, would be advantageous.

SUMMARY

A data processing system for administering a customizable fixed annuity product that has an associated account value and a plurality of investment sleeves includes at least one communication interface, a database, and at least one processor. The least one communication interface is configured to receive user input data related to the customizable fixed annuity product via one or more wired or wireless networks. The user input data indicates: for each of the investment sleeves, an index to which the investment sleeve is correlated, wherein the index is a mutual fund, a stock index, or a stock; and for each of the investment sleeves, a weight associated with the investment sleeve. Funds from the customizable fixed annuity product are not invested in the indices to which the investment sleeves are correlated. The database is configured to store information related to the customizable fixed annuity product, wherein the information related to the customizable fixed annuity product includes: a yield limiting parameter, wherein the yield limiting parameter is a participation rate parameter or a yield cap parameter; a loss limiting parameter, wherein the loss limiting parameter indicates a guaranteed minimum rate of return; for each of the investment sleeves, the index to which the investment sleeve is correlated, as indicated in the user input data; and for each of the investment sleeves, the weight associated with the investment sleeve, as indicated in the user input data. The at least one processor is configured to read the information related to the customizable fixed annuity product from the database and to determine, at a conclusion of a credit period for the customizable fixed annuity product, an updated account value for the customizable fixed annuity product. The updated account value is based on: the yield limiting parameter; the loss limiting parameter; the weights associated with the investment sleeves; the account value associated with the customizable fixed annuity product at a beginning of the credit period; and data that indicates changes in values of the indices to which the investment sleeves are correlated during the credit period. The at least one processor is further configured to store the updated account value for the customizable fixed annuity product in the database.

A computer-implemented method for administering a customizable annuity product that has an associated account value and a plurality of investment sleeves, includes storing, in a database, information related to the customizable annuity product. The information related to the customizable annuity product includes: a yield limiting parameter; for each of the investment sleeves, an index to which the investment sleeve is correlated, as indicated by user input data; and for each of the investment sleeves, a weight associated with the investment sleeve, as indicated by the user input data. Funds from the customizable annuity product are not invested in the indices to which the investment sleeves are correlated. The method further includes determining, by at least one processor, at a conclusion of a credit period for the customizable annuity product, an updated account value for the customizable annuity product. The updated account value is based on: the yield limiting parameter; the weights associated with the investment sleeves; the account value associated with the customizable annuity product at a beginning of the credit period; and data that indicates changes in values of the indices to which the investment sleeves are correlated during the credit period. The method further includes storing, in the database, the updated account value for the customizable annuity product.

A computer-readable medium has processor-executable instructions stored thereon which, when executed by at least one processor, will cause the at least one processor to perform a method for administering a customizable financial product that has an associated account value and a plurality of investment sleeves. The method includes receiving, by the at least one processor, information from a database related to the customizable financial product. The information related to the customizable financial product includes: for each of the investment sleeves, an index to which the investment sleeve is correlated wherein the index to which the investment sleeve is correlated is based on user input data; and for each of the investment sleeves, a weight associated with the investment sleeve, wherein the index to which the investment sleeve is correlated is based on the user input data. Funds from the customizable financial product are not invested in the indices to which the investment sleeves are correlated. The method further includes determining, by the at least one processor, at a conclusion of a time period, an updated account value for the customizable financial product. The updated account value is based on: the weights associated with the investment sleeves; the account value associated with the customizable financial product at a beginning of the time period; and data that indicates changes in values of the indices to which the investment sleeves are correlated during the time period. The method further includes storing, by the at least one processor, the updated account value for the customizable financial product in the database.

BRIEF DESCRIPTION OF THE DRAWINGS

A more detailed understanding may be had from the following description, given by way of example in conjunction with the accompanying drawings wherein.

DETAILED DESCRIPTION

Figure 1:
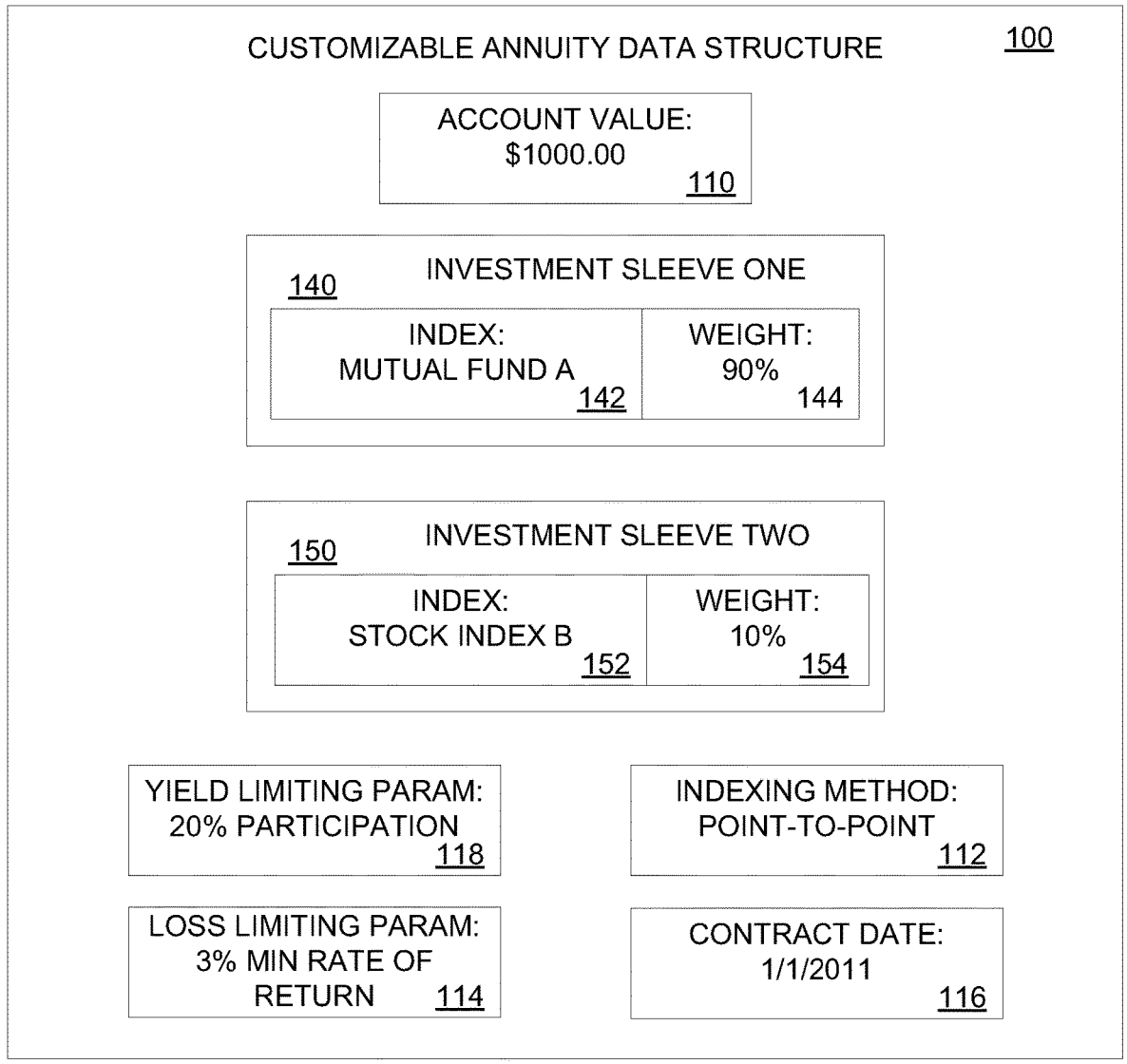
FIG. 1 shows a data structure that may be used to process data related to a customizable annuity product.

Disclosed herein are a computer system, a client device, computer-implemented methods, and related technologies that may be used for administering a customizable annuity product. With the customizable annuity product, a number of investment sleeves are defined, each of which is tied to an index such as a mutual fund or a stock index (such as the S&P 500). The purchaser of a customizable annuity product can customize attributes of their product, including how many investment sleeves are included in the product, the index to which each investment sleeve is tied, and how each investment sleeve is weighted (i.e., to what extent changes in the account value for the product is dependent upon each investment sleeve, relative to each of the other investment sleeves). During the accumulation phase of the annuity product, the account value of the product can fluctuate, based on the indices to which the various investment sleeves are tied—however, none of the funds from the annuity product are actually invested in the indices to which the investment sleeves are tied. In some instances (such as when the customizable annuity product is associated with a guaranteed minimum rate of return or other similar feature), the customizable annuity product may be considered a fixed annuity product. The disclosed computer system, computer-implemented methods, and related technologies may be used by an insurance company or other financial institution to administer the customizable annuity product and transmit/receive information to/from purchasers of customizable annuities regarding their customizable annuity products.

To purchase a customizable annuity product, an individual pays one or more premiums to an insurance company that offers the customizable annuity product. A customizable annuity product has, along with other features that are common to annuities, an account value. The account value is defined as the sum of the premiums paid by the annuity purchaser to purchase a customizable annuity product, increased by accumulated interest and credits from the insurance company, less the amount of withdrawals made by the annuity purchaser, reductions made by the insurance company, and charges (such as administrative charges) charged by the insurance company.

A customizable annuity has one or more investment sleeves. Each of the investment sleeves is tied to an index such as a mutual fund, a capital appreciation fund, a stock index (such as the S&P 500), an individual stock, a custom stock index created by the annuity purchaser, a custom stock index created by the insurance company, and/or any other type of index. As will be described in further detail below, the account value for a customizable annuity product may be increased or decreased, based on changes in the values of the correlated indices.

Types of mutual funds with which an investment sleeve may be correlated include capital appreciation funds, open-end funds, closed-end funds, unit investment funds, exchange-traded funds (ETFs), money market funds, equity funds, hybrid funds, and/or other types of funds. Types of stock indices with which an investment sleeve may be correlated include global stock indices, national indices, market sector indices, and/or other types of indices. Examples of indices with which an investment sleeve may be correlated include: the BBC Global 30; the Dow Jones Industrial Average; the Global Dow; the MSCI World; the S&P 500; the S&P Global 100; the S&P Global 1200; the NASDAQ Composite; and the Value Line Composite Index.

The customizable annuity product is a deferred annuity, and the timeline for the customizable annuity product is divided into two phases: an accumulation phase and an income phase. During the accumulation phase, the annuity purchaser may pay additional premiums into the customizable annuity product, thereby raising the account value. Further, the accumulation phase is divided into one or more periods referred to as "credit periods." At the end of each credit period, the insurance company determines to what extent the account value of the product should be credited or reduced, based on the performance of the indices to which the investment sleeves in the annuity are associated. As an example, if a customizable annuity product has a single investment sleeve, the investment sleeve is correlated to the S&P 500, and the value of the S&P 500 increases 5% during a given credit period, the account value for the customizable annuity product will be increased by 5%. It is important to note that no funds from the customizable annuity product are actually invested in the S&P 500 (as may be the case in a subaccount in variable annuity)—rather, the above-described increase only mirrors/tracks the performance of the S&P 500.

When the customizable annuity product is first purchased, the purchaser may decide the attributes of the investment sleeves. For example, the purchaser may decide how many investment sleeves the customizable annuity product will have, the indices to which the investment sleeves will be tied, and the weights of each investment sleeve. The annuity purchaser may be permitted to change these attributes during the accumulation phase at different times. For example, the annuity purchaser may be permitted to change these attributes at the beginning of each new credit period, once per calendar year, or at any periodic interval agreed upon between the insurance company and purchaser.

A customizable annuity product may be associated with one or more yield limiting parameters (such as a participation rate or a yield cap) that limit the maximum rate that the account value for the annuity may increase at the end of a credit period. A participation rate is defined as the percentage of the increase in the applicable index or indices that will be credited towards the account value. For example, if a participation rate is 80% and the indices correlated to the investment sleeves associated with the annuity increased 10% in value, then a percentage of 8% (i.e., 80% of 10%) would be credited towards the account value. A yield cap is defined as a maximum percentage of increase that can be credited to an account value at the end of a particular credit period. For example, if a yield cap is 10% and the indices in the investment sleeves associated with the annuity increased 20% in value, then a percentage of 10% of the value of the product would be credited towards the account value. The participation rates and yield caps are set by the insurance company. Alternatively or additionally, yield limiting parameters may be set for each investment sleeve individually. In an instance where yield limiting parameters are set for each investment sleeve individually, the insurance company may set the yield limiting parameters for an investment sleeve based on the index with which an investment sleeve is associated.

Further, a customizable annuity product may be associated with one or more loss limiting parameters. As one example, an annuity product may be associated with a guaranteed minimum rate of return. With a guaranteed minimum rate of return, the insurance company guarantees that, regardless of how the indices with which the investment sleeves are associated perform, the account value for the annuity product is increased at the end of each credit period according to at least a minimum rate. In an instance where a customized annuity product has a guaranteed minimum rate of return, the customized annuity product can be classified as a fixed annuity. Alternatively or additionally, a customizable annuity product may be associated with a loss cap that limits the maximum percentage of account value or maximum dollar amount of account value that may be lost at the end of a credit period. Alternatively or additionally, a customizable annuity may be associated with a loss limiting parameter that represents a guaranteed minimum account value. With a guaranteed minimum account value, the insurance company guarantees that, regardless of how the indices with which the investment sleeves are associated perform, the account value for the annuity product will not go below a guaranteed minimum value. A guaranteed minimum account value may be set as a percentage of the premiums paid into the annuity product (such as, for example, 100%, 90%, etc.), or a set dollar amount.

Additionally, a number of different approaches (or "indexing methods") may be used to determine the percentage increase (or decrease) that should be applied for a given index at the end of a credit period. In the "point-to-point" method, difference between the value of the index at the end of the credit period and the beginning of the credit period is determined. If, for example, a credit period runs from January 1st to December 31st of a given year and the index at issue is 5% higher on December 31st than it was on January 1st, then the percentage change would be determined as a 5% increase. Another approach is the "high-water mark" approach. In this approach, the highest value for the index during the credit period is determined, and compared against the value of the index at the beginning of the credit period. For example, if a credit period runs from January 1st to December 31st, the index achieves its highest value (10% higher) on May 31st, and the index is 5% lower on December 31st than on January 1st, then the percentage increase would be determined as 10%.

The duration of the credit period for a customizable annuity product may be, for example, one year, two years, five years, six months, or any other appropriate time period. Alternatively or additionally, the duration of a credit period may be equivalent to the duration of the accumulation phase.

As mentioned above, each investment sleeve in a customizable annuity product is associated with a weight, and the weights may be set by the purchaser of the annuity product. The weight of each investment sleeve indicates to what extent changes in the account value for the annuity product is dependent upon each investment sleeve, relative to each of the other investment sleeves. The weights may be defined as a set of percentages, the total of which sums to 100%. For example, a customizable annuity product may have two investment sleeves, where the first investment sleeve has a weight of 80% and the second investment sleeve has a weight of 20%. In an instance where a customizable annuity product has only a single investment sleeve, the single investment sleeve may be weighted at 100%. Further details regarding how weights are applied to determine increases/decreases to account values are provided herein with reference to, inter alia, FIG. 4. As mentioned above, weights for investment sleeves may be set by the purchaser of the annuity product; however, the insurance company may also set an upper limit (such as 10%, 20%, or any appropriate percentage) as to how much an investment sleeve may be weighted. The insurance company may set the upper limit for the weight of an investment sleeve based on the index with which an investment sleeve is associated, and/or other factors.

Following the accumulation phase of the customizable annuity product is the income phase. During the income phase, the insurance company pays distributions to the annuity purchaser. The amounts of the distributions are based on the amount of the account value at the time the accumulation phase ended, and may also depend upon other factors. The income phase may last for the remaining lifetime of the annuity purchaser or another individual or for a defined time period, such as a number of years. Alternatively, the insurance company may pay a single lump sum payment to the annuity purchaser, equivalent to the account value.

In addition to the features described above, the customizable annuity product may have other features such as a guaranteed minimum death benefit, and/or other features.

FIG. 1 shows an example data structure 100 that may be used to administer the customizable annuity product. The example data structure 100 may be used for the processing and communication of data related to the customizable annuity product, including for the data processing and communication described herein with reference to, inter alia, each or any one of FIGS. 2-7. The example data structure 100 represents an instance of a customizable annuity product. The data structure 100 includes a number of parameters 110, 112, 114, 116, 118, 140, 150 that represent different aspects of the annuity product. These parameters 110, 112, 114, 116, 118, 140, 150 include an account value parameter 110 (which, in the example of FIG. 1, has a value of $1000.00), an indexing method parameter 112, (which, in the example of FIG. 1, indicates a point-to-point method), a loss limiting parameter 114 (which, in the example of FIG. 1, indicates a 3% minimum rate of return), a contract data parameter 116 (which, in the example of FIG. 1, indicates a date of Jan. 1, 2011), and a yield limiting parameter 118 (which, in the example of FIG. 1, indicates a participation rate of 20%). The data structure 100 also includes two investment sleeve parameters 140, 150, each of which includes an index parameter 142, 152 and a weight parameter 144, 154. Although not shown in FIG. 1, the data structure 100 of FIG. 1 may alternatively or additionally include parameters for storing information related to each or any of the other attributes that a customizable annuity product might possess, as described herein.

Figure 2:
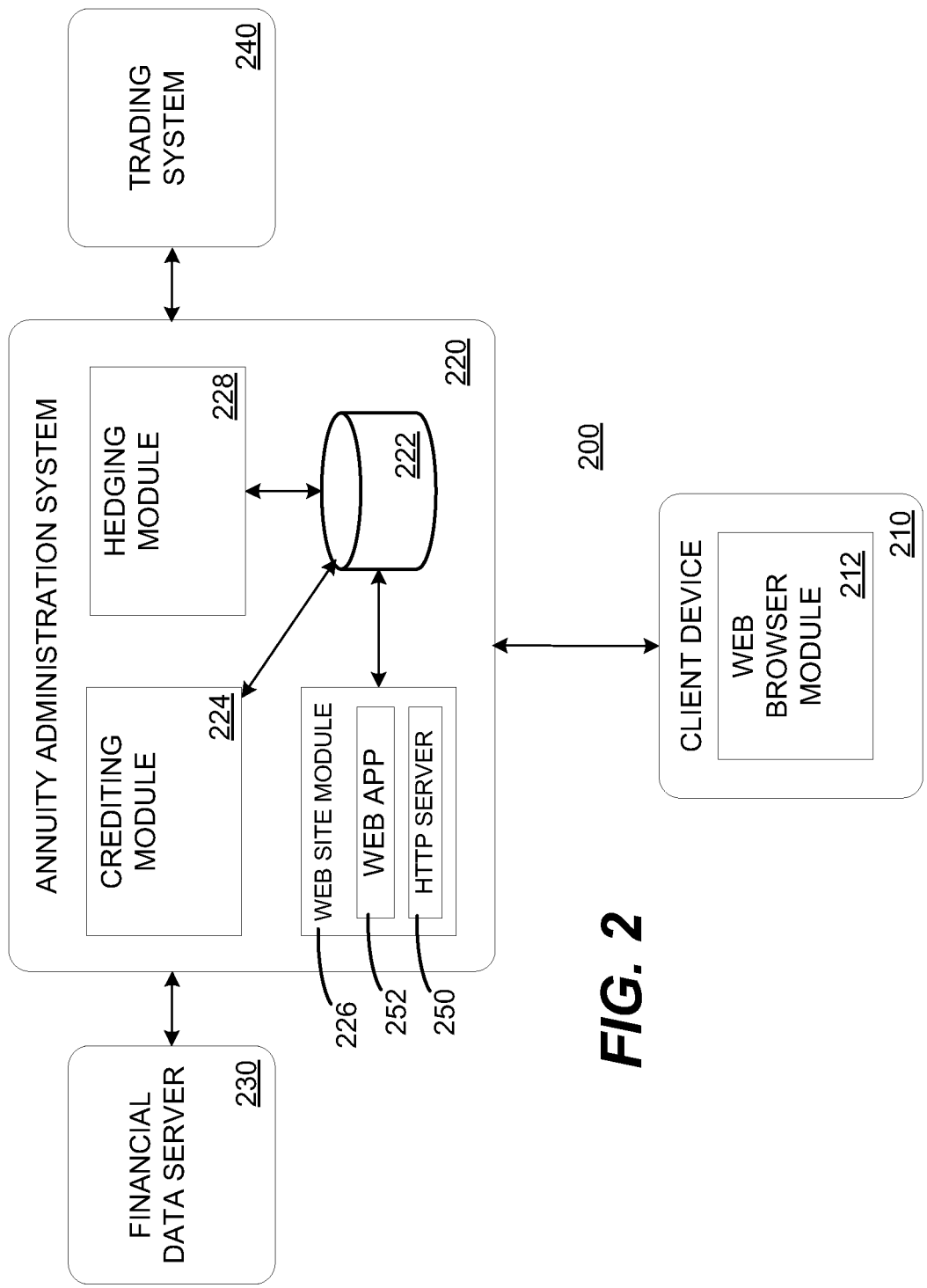
FIG. 2 shows an example architecture that may be used for administering a customizable annuity product.

FIG. 2 shows an example architecture 200 that may be used to administer the customizable annuity product. The example architecture 200 includes a client device 210, annuity administration system 220, a financial data server 230, and a trading system 240.

Included in annuity administration system 220 are a database 222, a web site module 226, a crediting module 224, and a hedging module 228. The annuity administration system 220 may be under the control of and/or operated on behalf of the insurance company that offers the customizable annuity product.

The database 222 in the annuity administration system 220 stores information related to the customizable annuity products sold by the insurance company. For each customizable annuity product, the database 222 stores information such as: information regarding the contract purchaser; information regarding the investment sleeves (i.e., for each investment sleeve, an identifiers of the index to which the investment sleeves is correlated, the weights of the investment sleeve, one or more yield limiting parameters or loss limiting parameters, and/or other related parameters); the total account value for the customizable annuity product; a unique identifier for the annuity product; attributes of the customizable annuity products such as that those shown in FIG. 1; and/or any other feature or combination of features of a customizable annuity product described herein. The database 222 may be spread across one or more computer-readable media, and may be or include one or more relational databases, hierarchical databases, object-oriented databases, one or more flat files, one or more spreadsheets, one or more structured files, and/or one or more other types of databases. The database 222 may be managed by one or more database management systems (not depicted), which may be based on technologies such as Microsoft SQL Server, MySQL, PostgreSQL, Oracle Relational Database Management System (RDBMS), a NoSQL database technology, and/or any other appropriate technologies.

The crediting module 224 in the annuity administration system 220 performs functionality such as periodically determining, for each of the customizable annuity products sold by the insurance company, how much the account value for the annuity should be credited/reduced and what new values for the account value should be. The crediting module 224 may do so using features described herein with reference to, inter alia, FIGS. 3 and 4. When the crediting module 224 determines an updated account value for a customizable annuity product, it stores the updated account value in the database 222.

The hedging module 228 in the annuity administration system 220 performs functionality such as determining trades and/or other transactions that should be made by the insurance company in order to hedge against the risks involved in selling the customizable annuity products.

The web site module 226 provides a web site via which annuity purchasers (such as the user of the client device 210 shown in FIG. 2) can purchase a customizable annuity product and/or access information about their customizable annuity products. Additionally, via the web site provided by the web site module 226, annuity purchasers can set/modify aspects of their customizable annuity products. This may include, for example, the annuity purchaser selecting/changing the indices to which investment sleeves are associated, assigning different weights to different investment sleeves, deleting investment sleeves, and/or creating new investment sleeves.

As shown in FIG. 2, the web site module 226 includes two sub-modules, the HyperText Transfer Protocol (HTTP) server module 250 and a web application module 252. The web application module 252 performs functionality for generating the web pages and related data that make up web site provided by the web site module 226. The web application module 252 generates the web pages in formats such as HyperText Markup Language (HTML), eXtensible HyperText Markup Language (XHTML), and/or any other appropriate format. The web application module 252 may be implemented in and/or based on a technology such as PHP: Hypertext Preprocessor (PHP), Ruby on Rails (RoR), Active Server Pages (ASP), any server-side scripting language or web application framework, a Content Management System (CMS) technology such as WordPress, Joomla, Drupal, and/or any other appropriate technology. The HTTP server module 250 implements the HTTP protocol, and transmits the web pages generated by the web application module 252 using HTTP. The HTTP server module 250 may be, for example, an Apache HTTP server module, a Sun-ONE Web Server, a Microsoft Internet Information Services (IIS) server, and/or may be based on any other appropriate HTTP server technology.

The client device 210 in the architecture 200 of FIG. 2 may be, for example, a desktop computer, a laptop computer, a netbook, a tablet computer, a personal digital assistant (PDA), a cellular phone, or any other appropriate device. The client device 210 includes a web browser module 212, via which a user of the client device 210 may access the web site provided by the web site module 226. The web browser module 212 in the client device 210 may include and/or communicate with one or more sub-modules that perform functionality such as transmitting and receipting HTTP messages, rendering HTML (including HTML5), rendering raster and/or vector graphics, executing JavaScript, and/or rendering multimedia content.

The financial data server 230 is a server that provides data that indicates the performance of the indices (such as mutual funds, stock indices, and/or other indices) to which investment sleeves in the customizable annuity products are associated. The financial data server 230 provides this data to the crediting module 224 in annuity administration system 220, and the crediting module 224 uses this information to determine account values for the annuity product. Further details regarding how the crediting module 224 uses this data are provided herein with respect to, inter alia, FIGS. 3 and 4.

The trading system 240 may be, for example, an Electronic Communication Network (ECN), an electronic trading platform, and/or any other type of electronic system for performing transactions such as the sale or purchase of stocks, bonds, options, and/or any other type of financial instrument. The trading system 240 may be controlled by and/or operated on behalf of, for example, a stock exchange or other similar entity. As described above, the hedging module 228 in the annuity administration system 220 may determine one or more transactions that should be made to hedge against the risks involved in the annuity product. Then, the hedging module 228 may send one or more messages to the trading system 240 to execute the transactions; the trading system 240 then executes the transactions. The hedging module 228 may communicate with the trading system 240 using technology such as Secure Socket Layer (SSL) technology, the Financial Information eXchange (FIX) protocol, and/or any other appropriate technology.

The annuity administration system 220 may be implemented using a single computing device, as one or more separate computing devices, or spread across any two or more computing devices. An example of a computing device that may be used for the implementation of any or any combination of these entities/components 222, 224, 228, 226 is the computing device 600 that is described herein with reference to FIG. 6. Alternatively or additionally, an example of a computing device that may be used for the implementation of the client device 210 is the computing device 600 that is described herein with reference to FIG. 6.

The communications described herein as taking place between the client device 210 (and the web browser module 212 in the client device 210), the financial data server 230, the trading system 240, and the modules 224, 226, 228, 250, 252 in the annuity administration system 220 may take place via one or more private or public wired or wireless networks. The one or more networks may be based on technologies such as Internet Protocol (IP), Wireless Local Area Network (WLAN) technology, cellular technologies, and/or other technologies, and the one or more networks may include the Internet.

For ease of description, FIG. 2 shows that the architecture 200 includes only a single client device 210, a single trading system 240, and a single financial data server 230. However, it should be understood that the architecture 200 of FIG. 2 may include any number of client devices, financial data servers, and/or trading systems, with characteristics similar to or identical to the client device 210, trading system 240, and/or financial data server 230 as described herein.

As a variation on the architecture 200 of FIG. 2, the hedging module 228 may not be included within the annuity administration system 220, but may instead be operated outside of the control of the insurance company by a third party.

Each or any combination of the modules shown in FIG. 2 (i.e., the crediting module 224, hedging module 228, web site module 226, web application module 252, HTTP server module 250, and/or web browser module 212) may be implemented as one or more software modules, one or more specific-purpose processor elements, or as combinations thereof. Suitable software modules include, by way of example, an executable program, a function, a method call, a procedure, a routine or sub-routine, one or more daemons or threads, one or more processor-executable instructions, an object, or a data structure.

Figure 3:
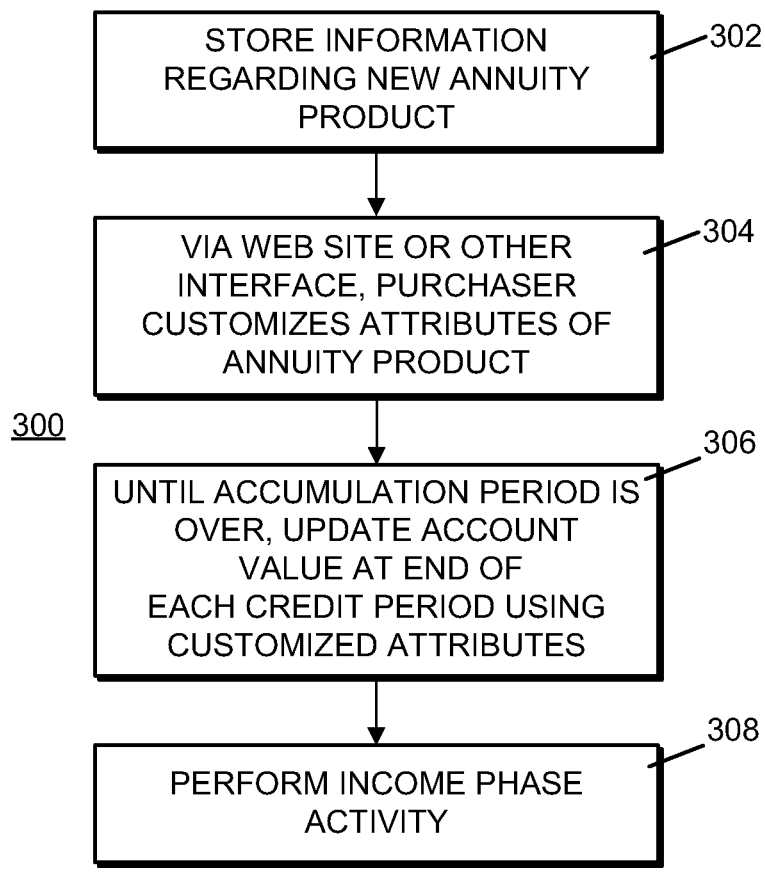
FIG. 3 shows a method for administering a customizable annuity product.

FIG. 3 shows an example method 300 that may be performed with the annuity administration system 220 of FIG. 2 for administering a customizable annuity product.

The method 300 of FIG. 3 begins at step 302 with the information regarding a new instance of the customizable annuity product being stored in the database 222. Step 302 may be performed, for example, when an annuity purchaser enters into a contract with the insurance company for a customizable annuity product. This information may include information such as that described above with reference to FIG. 2 as stored in the database 222.

At step 304, the purchaser of the annuity product customizes the attributes of their annuity product. This may be performed, for example, using one or more web pages that are generated by the web site module 226 and transmitted to the web browser module 212 in the client device 210, and which are displayed by the web browser module 212.

Figure 5:
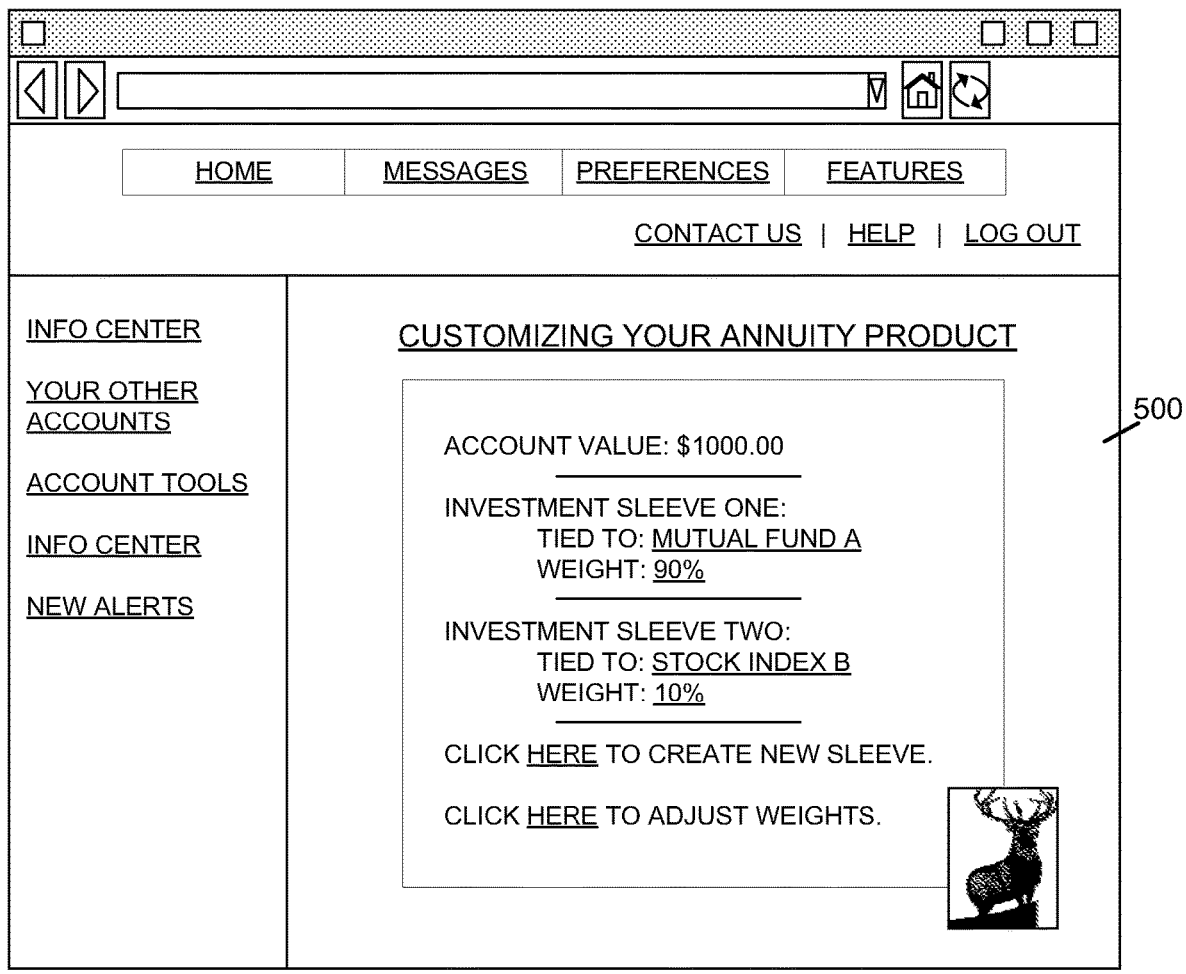
FIG. 5 shows an example web page that includes data related to customizable annuity product.

An example of a web page that may be generated by the web site module 226 and transmitted to the web browser module 212 at step 304 is shown in the example web page 500 of FIG. 5. As shown in the example web page 500 of FIG. 5, the web browser module 212 may receive user input data that defines attributes of the annuity product, such as the number of investment sleeves associated with the product, the weights associated with the investment sleeves, the indices to which the investment sleeves are correlated, and/or other attributes.

Alternatively or additionally, the one or more web pages generated by the web site module 226 and transmitted to the web browser module 212 for display by the web browser module 212 in step 304 may include user interface elements (such as drop-down boxes, search boxes, radio boxes, checkboxes, and/or other types of user interface elements and/or web forms) that permit the user of the client device 210 to select/customize attributes of their annuity product, such as the number of investment sleeves associated with the product, the weights associated with the investment sleeves, the indices to which the investment sleeves are correlated, and/or other attributes. In the user interface elements, each or any of the different types of indices mentioned herein as indices to which an investment sleeve may be correlated may be presented to the user for selection. Alternatively or additionally, the one or more web pages may enforce restrictions on the users' options in terms of the maximum weight that may be associated with a given investment sleeve (based on the index to which the investment sleeve is correlated), may restrict possible combinations of indices with which investment in a single product may be correlated, and/or may restrict user selection in other ways as required by the insurance company. As one example, the insurance company may determine that, for any investment sleeve that is correlated to a particular index (such as an example capital appreciation fund, Capital Appreciation Fund A), the maximum weight that the user may set as the weight for the investment sleeve is 15%. In this example, the user interface elements in the one or more web pages may restrict user input such that the user cannot set the weight for an investment sleeve that is correlated to Capital Appreciation Fund A to a value greater than 15%. This may be performed by, for example, displaying a warning dialog box if the user attempts to set a value greater than 15%. The web browser module 212 may transmit the user input data that describes the customization choices made by the user to the web site module 226 in one or more HTTP POST requests and/or other types of messages, and the web site module 226 may store information that indicates the attributes of the annuity product (as specified in the user input data) in the database 222.

Referring again to FIG. 3, at step 306, the crediting module 224 periodically (at the end of every credit period associated with the annuity product) determines how much the account value for the annuity product should be increased/decreased, and updates the account value for annuity product accordingly. The crediting module 224 may determine an updated account value for the annuity product at the end of a given credit period using the method of FIG. 4, and/or any other appropriate method. Step 306 may include the crediting module 224 adding data to and/or modifying data in the database 222 to indicate the updated account value, to indicate the change in account value versus the last credit period, and/or to indicate other information related to the change in the account value.

When the accumulation phase for the annuity product concludes, the method of FIG. 3 proceeds to step 308. At step 308, components in the annuity administration system 220 may perform income phase activity. This may include, for example, the crediting module 224 adding data to and/or modifying data in the database 222 that indicates that the accumulation phase for the annuity product has concluded. This may also include the web site module 226 in the annuity administration system 220 generating and transmitting one or more web pages to the web browser module 212 in the client device 210 that include information related to distributions and/or other income phase attributes of the annuity product.

Alternatively or additionally, at any point during the method 300 of FIG. 3, the web site module 226 in the annuity administration system 220 may generate and transmit one or more web pages to the web browser module 212 for display in the client device 210 that indicate the account value and/or other attributes of the annuity product. Alternatively or additionally, the one or more web pages may reflect a "running total" of the account value at a given time (i.e., what the account value would become if the credit period were to end at that moment and the account value was increased/decreased); in such an instance, the value for the "running total" may be determined by the crediting module 224 using the method of FIG. 4, and/or any other appropriate method.

Alternatively or additionally, at various times during the method 300 of FIG. 3, the annuity purchaser may periodically change the attributes of their customizable annuity product. This may be performed using features identical to or similar to those described above with respect to step 304 and/or the example web page 500 of FIG. 5. The annuity purchaser may be permitted to change the attributes of their customizable annuity product at, for example, the beginning of each new credit period, once per calendar year, and/or at any interval agreed upon between the insurance company and purchaser.

As one variation on the method 300 of FIG. 3 described above, the actions described above as performed in step 302 and step 304 may modified, such that an annuity purchaser may first define the attributes of a customizable annuity product that they wish to purchase using the web site provided by the web site module 226 (using one or more web pages and/or other features the same or similar to those described above with reference to step 304 of FIG. 3 and/or the web page 500 of FIG. 5), and then enter into an agreement with the insurance company for the purchase of the annuity product directly via the web site provided by the web site module 226.

Figure 4:
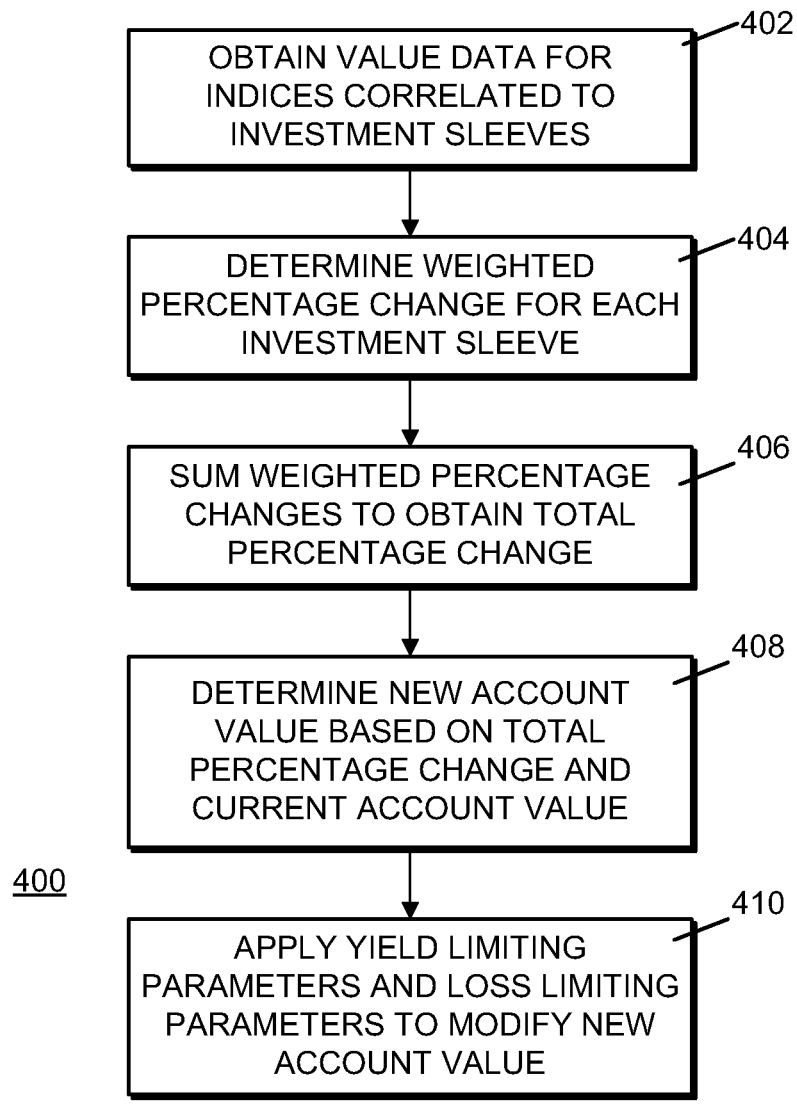
FIG. 4 shows a method for determining an updated account value for a customizable annuity product.

Referring now to FIG. 4, FIG. 4 shows a method 400 that may be performed by the crediting module 224 for determining an updated account value at the end of a credit period.

The method of FIG. 400 begins with step 402, where the crediting module 224 obtains value data for the indices to which the investment sleeves in the customizable annuity product are correlated, for the given credit period. As one example, the value data may indicate, for each index, the value for the index at the end of each business day during the credit period. Step 402 may include the crediting module 224 sending one or more query messages to the financial data server 230 in the architecture 200 of FIG. 2 via one or more wired or wireless networks, and then receiving the value/performance data in one or more response messages via the one or more wired or wireless networks. Alternatively or additionally, this value data may be stored in the database 222, and the crediting module 224 may obtain the data via one or more queries to the database 222.

Then, at step 404, the crediting module 224 determines a weighted percentage change for each investment sleeve. For each investment sleeve, this may be performed as follows: the crediting module 224 may analyze the value data obtained at step 402, using the appropriate indexing method (which may be, for example, a point-to-point or high-water mark method, or any other appropriate method), to obtain the change in value for the index to which the investment sleeve is correlated for the time period; the crediting module 224 may determine the percentage change in the value of the index, based on the change in value and the original value of the index at the beginning of the credit period; and the crediting module 224 may then multiply the percentage change in the value of the index by the weight associated with the investment sleeve. As an example, a customizable annuity product may have two investment sleeves, where the first investment sleeve has a weight of 80% and the second investment sleeve has a weight of 20%. The crediting module 224 may determine (using different indexing methods or the same indexing methods, as appropriate) that the percentage change in value of the index to which the first investment sleeve is correlated is −10%, and that the percentage change in value of the index to which the second investment sleeve is correlated is +100%. The crediting module 224 would then determine that the weighted percentage change for the first investment sleeve is −8% (i.e., the weight of 80% multiplied by the decrease in value of 10%) and would determine that the weighted percentage change for the second investment sleeve is 20% (i.e., the weight of 20% multiplied by the increase in value of 100%).

Then, at step 406, the crediting module 224 sums the weighted percentage changes for each index associated with the investment sleeves, arriving at a total percentage change. Referring again to the above example wherein the crediting module 224 determines two weighted percentage changes of −8% and 20%, at step 406 the crediting module 224 would determine the total percentage change as +12%.

Next, at step 408, the crediting module 224 determines a new account value based on the total percentage change (as determined at step 406) and the current account value (i.e., the account value as of the beginning of the given credit period) for the customizable annuity product. This may include the crediting module 224 multiplying the total percentage change to the current account value and adding the result of the multiplication to the current account value for the customizable annuity product. Referring again to the above example wherein the crediting module 224 determines a total percentage change of +12%, if the current account value for the customizable annuity product is $1000.00, the crediting module 224 would determine a new account value for the product as $1120.00 (i.e., as ($1000.00×12%)+($1000.00)).

Then, at step 410, the crediting module 224 applies one or more yield limiting parameters and/or loss limiting parameters to the new account value determined in step 408 to arrive at a finalized new account value. As an example, if the customized annuity product is associated with a yield limiting parameter that indicates a cap of 10%, then the crediting module 224 may compare the new account value determined in step 408 to a 10% increase from the account value at the beginning of the credit period. If the crediting module 224 determines that the new account value determined at step 408 is greater than the permitted 10% increase, then the crediting module 224 may reduce the determined new account value such that it reflects a 10% increase over the account value at the beginning of the credit period. Referring again to the above example wherein the crediting module 224 determines a new account value as $1120.00, if the customized annuity product is associated with a cap of 10%, then the crediting module 224 would reduce the new account value from $1120.00 (as determined at step 408) to $1100.00 (i.e., to 10% over the $1000.00 account value from the beginning of the credit period). At step 410, the crediting module 224 may apply any other yield limiting parameters and/or loss limiting parameters, in the same or a similar fashion.

It should be understood that the steps shown in FIG. 4 and described above are only one example of how the crediting module 224 may determine an updated account value for an instance of a customized annuity product, and that the crediting module 224 may be configured to perform many variations of the steps shown in FIG. 4, and/or any other appropriate method for determining an updated account value.

Tables One through Four, provided below, show additional examples of customized annuity products and of how the crediting module 224 may determine updated account values for customized annuity products.

Table One shows an example wherein a customized annuity product has a single investment sleeve that is correlated to the S&P 500. In the example of Table One, the customized annuity product has a credit period of one year, has an initial count value of $100,000.00, and is associated with a loss limiting parameter which indicates that the account value will not decrease during a given credit period. This loss limiting parameter may be characterized as a guaranteed minimum rate of return of 0%. The customized annuity product is also associated with a yield limiting parameter, which is a yield cap of 7%. Table One includes the following columns: a "Year" column; a "Beginning AV" column; a "Performance Rate" column; a "Percentage Change in AV" column; a "Change in AV" column; and an "Ending AV" column. Each row in Table One corresponds to a year in the accumulation period of the annuity product, and the columns in Table One indicate the following information: the Year column indicates the year; the Beginning AV column that indicates the account value for the annuity product at the beginning of the year; the Performance Rate column indicates the percentage change in value for the S&P 500 in the year; the Percentage Change in AV column that indicates the percentage change for the annuity product for the year (this value is based on the Performance Rate for the year, as well as the yield limiting and loss limiting parameters associated with the annuity product); the Change in AV row indicates the dollar amount changed for the account value for the year (this value is based on the Percentage Change in AV and the Beginning AV for the year); and the Ending AV indicates the updated account value for the annuity product at the end of the year (this value is based on the Change in AV and Beginning AV for the year).

TABLE ONE

| Year | Beginning AV | Performance Rate | Percentage Change in AV | Change in AV | Ending AV |
|---|---|---|---|---|---|
| 1 | $100,000 | 23.1% | 7.0% | $ 7,000 | $107,000 |
| 2 | $107,000 | 26.0% | 7.0% | $ 7,490 | $114,490 |
| 3 | $114,490 | 30.3% | 7.0% | $ 8,014 | $122,504 |
| 4 | $122,504 | 17.8% | 7.0% | $ 8,575 | $131,080 |
| 5 | $131,080 | −9.2% | 0.0% | $ 0 | $131,080 |
| 6 | $131,080 | −12.9% | 0.0% | $ 0 | $131,080 |
| 7 | $131,080 | −24.3% | 0.0% | $ 0 | $131,080 |
| 8 | $131,080 | 26.7% | 7.0% | $ 9,176 | $140,255 |
| 9 | $140,255 | 9.4% | 7.0% | $ 9,818 | $150,073 |
| 10 | $150,073 | 3.7% | 3.7% | $ 5,531 | $155,604 |
| 11 | $155,604 | 13.4% | 7.0% | $10,892 | $166,496 |
| 12 | $166,496 | 3.5% | 3.5% | $ 5,776 | $172,272 |
| 13 | $172,272 | −41.2% | 0.0% | $ 0 | $172,272 |
| 14 | $172,272 | 29.4% | 7.0% | $12,059 | $184,331 |
| 15 | $184,331 | 11.9% | 7.0% | $12,903 | $197,235 |

Table Two relates to an example wherein the customized annuity product has a single investment sleeve that is correlated to the S&P 500. The example of Table Two is identical to the example of Table One, with the exception that the customized annuity product in the example of Table Two is associated with a participation rate of 50% (instead of a yield cap parameter). The columns in Table Two indicate the same information, mutatis mutandis, as the corresponding columns from Table One.

TABLE TWO

| Year | Beginning AV | Performance Rate | Percentage Change in AV | Change in AV | Ending AV |
|---|---|---|---|---|---|
| 1 | $100,000 | 23.1% | 11.6% | $11,575 | $111,575 |
| 2 | $111,575 | 26.0% | 13.0% | $14,490 | $126,064 |
| 3 | $126,064 | 30.3% | 15.1% | $19,072 | $145,136 |
| 4 | $145,136 | 17.8% | 8.9% | $12,953 | $158,089 |
| 5 | $158,089 | −9.2% | 0.0% | $ 0 | $158,089 |
| 6 | $158,089 | −12.9% | 0.0% | $ 0 | $158,089 |
| 7 | $158,089 | −24.3% | 0.0% | $ 0 | $158,089 |
| 8 | $158,089 | 26.7% | 13.4% | $21,136 | $179,225 |
| 9 | $179,225 | 9.4% | 4.7% | $ 8,398 | $187,623 |
| 10 | $187,623 | 3.7% | 1.8% | $ 3,457 | $191,080 |
| 11 | $191,080 | 13.4% | 6.7% | $12,808 | $203,888 |
| 12 | $203,888 | 3.5% | 1.7% | $ 3,537 | $207,425 |
| 13 | $207,425 | −41.2% | 0.0% | $ 0 | $207,425 |
| 14 | $207,425 | 29.4% | 14.7% | $30,452 | $237,877 |
| 15 | $237,877 | 11.9% | 6.0% | $14,187 | $252,064 |

Table Three relates to an example wherein a customized annuity product has single investment sleeve that is correlated to a capital appreciation fund. In the example of Table Three, the customized annuity product has the same characteristics as the customized annuity product of the example of Table One, except that the single investment sleeve of the annuity product of Table Three is correlated to a capital appreciation fund, and the annuity product of Table Three has a yield cap of 6.5% (instead of the 7% in the example of Table One). The columns in Table Three indicate the same information, mutatis mutandis, as the corresponding columns from Table One.

TABLE THREE

| Year | Beginning AV | Performance Rate | Percentage Change in AV | Change in AV | Ending AV |
|---|---|---|---|---|---|
| 1 | $100,000 | 37.75% | 6.5% | $ 6,500 | $106,500 |
| 2 | $106,500 | 55.11% | 6.5% | $ 6,923 | $113,423 |
| 3 | $113,423 | 3.26% | 3.3% | $ 3,698 | $117,120 |
| 4 | $117,120 | 66.76% | 6.5% | $ 7,613 | $124,733 |
| 5 | $124,733 | 8.35% | 6.5% | $ 8,108 | $132,841 |
| 6 | $132,841 | −6.74% | 0.0% | $ 0 | $132,841 |
| 7 | $132,841 | −22.86% | 0.0% | $ 0 | $132,841 |
| 8 | $132,841 | 40.40% | 6.5% | $ 8,635 | $141,475 |
| 9 | $141,475 | 17.93% | 6.5% | $ 9,196 | $150,671 |
| 10 | $150,671 | 15.10% | 6.5% | $ 9,794 | $160,465 |
| 11 | $160,465 | 15.66% | 6.5% | $10,430 | $170,895 |
| 12 | $170,895 | 16.18% | 6.5% | $11,108 | $182,003 |
| 13 | $182,003 | −46.09% | 0.0% | $ 0 | $182,003 |
| 14 | $182,003 | 42.83% | 6.5% | $11,830 | $193,833 |
| 15 | $193,833 | 12.87% | 6.5% | $12,599 | $206,432 |

Table Four relates to another example wherein a customized annuity product has a single investment sleeve that is correlated to a capital appreciation fund. In the example of Table Four, the customized annuity product has the same characteristics as the customized annuity product of the example of Table Three (i.e., has a single investment sleeve that is correlated to a capital appreciation fund, and so on), except that the customized annuity product in the example of Table Four is associated with a participate rate parameter of 40% (instead of the yield cap in the example of Table Three). The columns in Table Four indicate the same information, mutatis mutandis, as the corresponding columns from Table One.

TABLE FOUR

| Year | Beginning AV | Performance Rate | Percentage Change in AV | Change in AV | Ending AV |
|---|---|---|---|---|---|
| 1 | $100,000 | 37.75% | 15.1% | $15,100 | $115,100 |
| 2 | $115,100 | 55.11% | 22.0% | $25,373 | $140,473 |
| 3 | $140,473 | 3.26% | 1.3% | $ 1,832 | $142,304 |
| 4 | $142,304 | 66.76% | 26.7% | $38,001 | $180,305 |
| 5 | $180,305 | 8.35% | 3.3% | $ 6,022 | $186,328 |
| 6 | $186,328 | −6.74% | 0.0% | $ 0 | $186,328 |
| 7 | $186,328 | −22.86% | 0.0% | $ 0 | $186,328 |
| 8 | $186,328 | 40.40% | 16.2% | $30,111 | $216,438 |
| 9 | $216,438 | 17.93% | 7.2% | $15,523 | $231,961 |
| 10 | $231,961 | 15.10% | 6.0% | $14,010 | $245,972 |
| 11 | $245,972 | 15.66% | 6.3% | $15,408 | $261,379 |
| 12 | $261,379 | 16.18% | 6.5% | $16,916 | $278,296 |
| 13 | $278,296 | −46.09% | 0.0% | $ 0 | $278,296 |
| 14 | $278,296 | 42.83% | 17.1% | $47,678 | $325,973 |
| 15 | $325,973 | 12.87% | 5.1% | $16,781 | $342,754 |

To determine updated account values (i.e., the values in the Ending AV columns) for the customizable annuity products provided in the examples of Table One through Table Four, the crediting module 224 may use the method shown in FIG. 4, a variation on the method of FIG. 4, and/or any other appropriate method.

Figure 6:
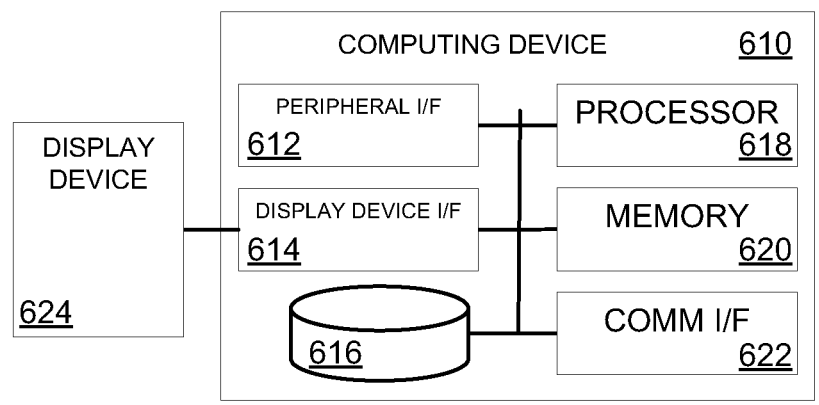
FIG. 6 shows a computing device that may be used to implement features described herein.

Referring now to FIG. 6, FIG. 6 shows an example computing device 610 that may be used to implement features described herein. The computing device 610 includes a processor 618, memory device 620, communication interface 622, peripheral device interface 612, display device interface 614, and data storage device 616. FIG. 6 also shows a display device 624, which may be coupled to or included within the computing device 610.

The memory device 620 may be or include a device such as a Dynamic Random Access Memory (D-RAM), Static RAM (S-RAM), or other RAM or a flash memory. The data storage device 616 may be or include a hard disk, a magneto-optical medium, an optical medium such as a CD-ROM, a digital versatile disk (DVDs), or Blu-Ray disc (BD), or other type of device for electronic data storage.

The communication interface 622 may be, for example, a communications port, a wired transceiver, a wireless transceiver, and/or a network card. The communication interface 622 may be capable of communicating using technologies such as Ethernet, fiber optics, microwave, xDSL (Digital Subscriber Line), WLAN technology, wireless cellular technology, and/or any other appropriate technology.

The peripheral device interface 612 is configured to communicate with one or more peripheral devices. The peripheral device interface 612 operates using a technology such as Universal Serial Bus (USB), PS/2, Bluetooth, infrared, serial port, parallel port, and/or other appropriate technology. The peripheral device interface 612 may, for example, receive input data from an input device such as a keyboard, a mouse, a trackball, a touch screen, a touch pad, a stylus pad, and/or other device. Alternatively or additionally, the peripheral device interface 612 may communicate output data to a printer that is attached to the computing device 610 via the peripheral device interface 612.

The display device interface 614 may be an interface configured to communicate data to display device 624. The display device 624 may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device interface 614 may operate using technology such as Video Graphics Array (VGA), Super VGA (S-VGA), Digital Visual Interface (DVI), High-Definition Multimedia Interface (HDMI), or other appropriate technology. The display device interface 614 may communicate display data from the processor 618 to the display device 624 for display by the display device 624. As shown in FIG. 6, the display device 624 may be external to the computing device 610, and coupled to the computing device 610 via the display device interface 614. Alternatively, the display device 624 may be included in the computing device 600.

An instance of the computing device 610 of FIG. 6 may be configured to perform any feature or any combination of features described herein as performed by the client device 210. Alternatively or additionally, the memory device 620 and/or the data storage device 616 may store instructions which, when executed by the processor 618, cause the processor 618 to perform any feature or any combination of features described above as performed by the web browser module 212. Alternatively or additionally, each or any of the features described above as performed by web browser module 212 may be performed by the processor 618 in conjunction with the memory device 620, communication interface 622, peripheral device interface 612, display device interface 614, and/or data storage device 616.

Alternatively or additionally, an instance of the computing device 610 of FIG. 6 may be configured to perform any feature or any combination of features described herein as performed by the annuity administration system 220. Alternatively or additionally, the memory device 620 and/or the data storage device 616 may store instructions which, when executed by the processor 618, cause the processor 618 to perform any feature or any combination of features described herein as performed by each or any combination of the crediting module 224, hedging module 228, web site module 226, web application module 252, and HTTP server module 250. Alternatively or additionally, the functionality described herein as performed by each or any combination of the crediting module 224, hedging module 228, web site module 226, web application module 252, and HTTP server module 250 may be spread across two or more instances of the computing device 610.

Figure 7:
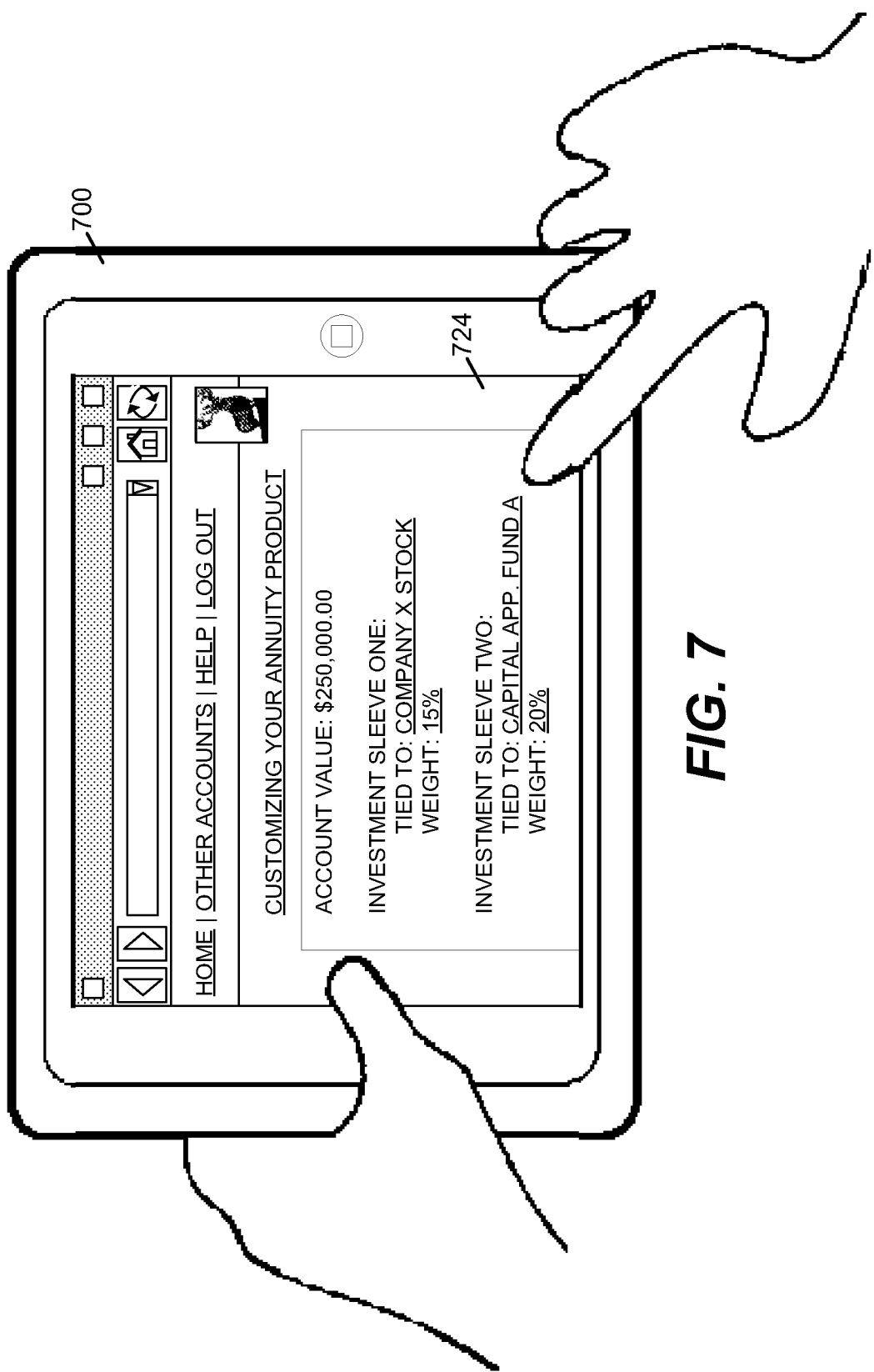
FIG. 7 shows a tablet computer that is a more specific example of the computing device of FIG. 6.

FIG. 7 shows a tablet computer 710 that is a more specific example of the computing device 610 of FIG. 6. The tablet computer 710 may include a processor (not depicted), memory device (not depicted), communication interface (not depicted), peripheral device interface (not depicted), display device interface (not depicted), storage device (not depicted), and touch screen display 724, which may possess characteristics of the processor 618, memory device 620, communication interface 622, peripheral device interface 612, display device interface 614, data storage device 616, and display device 624, respectively, as described above with reference to FIG. 6. The touch screen display 724 may receive user input using technology such as, for example, resistive sensing technology, capacitive sensing technology, optical sensing technology, or any other appropriate touch-sensing technology.

Examples are provided above wherein the purchaser of the customizable annuity product and the beneficiary of the customizable annuity product are assumed to be the same person. As a variation on the features described above, beneficiary and the purchasers of the customizable annuity product may be different persons.

Although examples are provided above wherein the annuity purchaser is referred as an individual or a person, the purchaser of a customizable annuity product may also be a corporation, trust, or other non-person entity. In such an instance, the actions described above as performed by the annuity purchaser may be performed by a person that has some relationship to the contract owner (e.g., is an employee of the contract owner or a trustee of the trust).

Although examples are provided above wherein an insurance company has issued the customizable annuity product, the features described herein are also applicable and/or may be used by, mutatis mutandis, any type of financial institution or other business.

Although examples are provided above wherein the customizable annuity product is referred to as an annuity product, the features described herein are also applicable and/or may be used with any appropriate type of financial product.

Although the methods and features are described above with reference to the example architecture 200 of FIG. 2, the methods and features described above may be performed, mutatis mutandis, using any appropriate architecture and/or computing environment.

As used herein, the term "processor" broadly refers to and is not limited to a single- or multi-core processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used to herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

Although features and elements are described above in particular combinations, each feature or element can be used alone or in any combination with or without the other features and elements. For example, each feature or element as described above with reference to FIGS. 1-7 may be used alone without the other features and elements or in various combinations with or without other features and elements. Sub-elements and/or sub-steps of the methods described above with reference to FIGS. 1-7 may be performed in any arbitrary order (including concurrently), in any combination or sub-combination.

What is claimed is:

1. A data processing system, comprising:
a web site module configured to generate graphical user interfaces, the graphical user interfaces including, on a single screen, an indication of an account value of a customizable fixed annuity product, and indications of a plurality of investment sleeves, wherein each investment sleeve indication includes, in a screen area, an indication of one of a plurality of indices to which the investment sleeve is correlated, and links and user interface elements, which are active only during selected intervals, and which:
(a) enable selection via the graphical user interface of a number of investment sleeves of the customizable fixed annuity product;
(b) present each of the indices to which one of the investment sleeves may be correlated for selection via the graphical user interface; and
(c) enable adjustment via the graphical user interface of weight settings indicative of weights of investment sleeves,
wherein the user interface elements are operative to, responsive to a user attempt to set a weight for one of the plurality of investment sleeves to a value greater than a predetermined maximum weight based on an index to which the one of the plurality of investment sleeves is correlated, display a warning dialog box, and to enable generation of a further sleeve, and wherein the user interface elements are further operative to enforce one or more restrictions on combinations of an index to which the generated further sleeve is correlated and an index to which one of the plurality of investment sleeves is correlated;
at least one communication interface configured to:
transmit, via one or more wired or wireless networks, the graphical user interfaces, to one or more remote client devices, for display on web browser modules;
receive, via one or more HTTP POST requests, user input data indicative of user input via the graphical user interfaces, from a plurality of users related to the customizable fixed annuity products via one or more wired or wireless networks, wherein:
the users being purchasers of the customizable fixed annuity products, and wherein the user input data indicates:
for each of the plurality of investment sleeves of each of the products, an index to which the investment sleeve is correlated, wherein the index is a mutual fund, a stock index, or a stock, and wherein a different index is correlated with each of at least two of the investment sleeves; and for each of the investment sleeves, a user determined weight associated with the investment sleeve relative to others of the plurality of investment sleeves; and funds from the customizable fixed annuity product are not invested in the indices to which the investment sleeves are correlated;

a database stored on one or more computer-readable media and configured to store information related to the customizable fixed annuity product, wherein the information related to the customizable fixed annuity product includes:

a yield limiting parameter, wherein the yield limiting parameter is a participation rate parameter or a yield cap parameter;

a loss limiting parameter, wherein the loss limiting parameter indicates a guaranteed minimum rate of return;

for each of the investment sleeves, the index to which the investment sleeve is correlated, according to the user input data; and for each of the investment sleeves, the weight associated with the investment sleeve, according to the user input data;

at least one computer processor;

a memory device in communication with the computer processor and storing computer-readable instructions, which instructions, when executed by the at least one processor, cause the at least one processor to:

read the information related to the customizable fixed annuity product from the database;

generate, by the at least one processor, based on said read information, a time window segmented into a plurality of credit period intervals, defining an accumulation window, in which the purchaser of the customizable fixed annuity product is enabled to pay additional premiums; and generate a programming loop that tests demands to exercise modifications to attributes of said customizable fixed annuity product with conditional programming associated with the end of each of said plurality of credit periods within said accumulation window;

wherein the processor receives an indication from the programming loop at the end of each credit period interval for the customizable fixed annuity product, to compute an updated account value for the customizable fixed annuity product, wherein the updated account value is determined by:

generating and transmitting one or more query messages to a financial data server system;

receiving from the financial data server system one or more response messages responsive to the one or more query messages, the one or more response messages including value data for each of the indices to which the investment sleeves are correlated;

determining, based in part on data in the received one or more response messages, for each of the investment sleeves, a percentage change in value for the index to which the investment sleeves is correlated during the credit period;

determining, for each of the investment sleeves, a weighted percentage change for the investment sleeve, wherein the weighted percentage change is a product of:

the percentage change in the value for the index to which the investment sleeves is correlated during the credit period; and the user determined weight associated with the investment sleeve;

determining a total percentage change for the investment sleeves, wherein the total percentage change is a sum of the weighted percentage changes for the investment sleeves;

applying the determined total percentage change to the account value associated with the customizable fixed annuity product at a beginning of the credit period to determine a preliminary new account value; and determining whether either one of the yield limiting parameter and the loss limiting parameter is applicable, and responsive to determining that one of the yield limiting parameter and the loss limiting parameter is applicable, adjusting the preliminary new account value to determine the updated account value, and, responsive to determining that neither of the yield limiting parameter and the loss limiting parameter is applicable, determining that the updated account value is the preliminary account value;

store the updated account value for the customizable fixed annuity product in the database;

the instructions further causing the one or more processors to determine one or more transactions responsive to received user allocations, and to transmit messages having data indicative of instructions to execute the transactions, the messages formatted according to the Financial Information eXchange (FIX) protocol, via one or more networks, to an electronic trading platform;

wherein the web site module is further configured to, prior to purchase of the customizable fixed annuity product, generate a graphical user interface including links and user interface elements that:

(a) enable selection via the graphical user interface of a number of investment sleeves of the customizable fixed annuity product;

(b) present each of the indices to which one of the investment sleeves may be correlated for selection via the graphical user interface;

(c) receive user selections of the indices to which each of the investment sleeves is to be correlated;

(d) receive user selections of weight settings indicative of weights of the investment sleeves; and, subsequent to receipt via the graphical user interface of the user selections of the indices and weight settings for the investment sleeves, present via the graphical user interface an agreement for purchase of a corresponding customizable fixed annuity product for entry by a customer via the user interface.

2. The data processing system of claim 1, wherein:

the at least one communication interface is configured to receive one or more HyperText Transfer Protocol (HTTP) messages from a client device via the one or more wired or wireless networks, wherein the one or more HTTP messages indicate a request for information related to the customizable fixed annuity product; wherein the at least one processor is further configured to:

generate web page data, wherein the web page data describes a web page that indicates the updated account value for the customizable fixed annuity product; and generate one or more HTTP messages that include the web page data;

wherein the at least one communication interface is further configured to transmit the one or more HTTP messages that include the web page data via the one or more wired or wireless networks.

3. The data processing system of claim 1, wherein, for an investment sleeve from the investment sleeves, the index to which the investment sleeve is correlated is: a capital appreciation fund; a custom stock index; the BBC Global 30; the Dow Jones Industrial Average; the Global Dow; the MSCI World; the S&P 500; the S&P Global 100; the S&P Global 1200; the NASDAQ Composite; or the Value Line Composite Index.

4. The data processing system of claim 1, wherein the at least one processor is configured to determine the percentage changes in the values for the indices using a point-to-point method or a high-water mark method.

5. The data processing system of claim 1, wherein a predetermined limit is set as to the weight associated with an investment sleeve.

\* \* \* \* \*